United States Patent
Lysytskyy et al.

(10) Patent No.: US 8,413,066 B2
(45) Date of Patent: Apr. 2, 2013

(54) VIRTUAL KEYBOARD WITH VISUALLY ENHANCED KEYS

(76) Inventors: Dmytro Lysytskyy, Kiev (UA); Andriy Pavliv, Lviv (UA)

( * ) Notice: Subject to any disclaimer, the term of this patent is extended or adjusted under 35 U.S.C. 154(b) by 308 days.

(21) Appl. No.: 12/612,873

(22) Filed: Nov. 5, 2009

(65) Prior Publication Data
US 2010/0115448 A1    May 6, 2010

Related U.S. Application Data

(60) Provisional application No. 61/111,891, filed on Nov. 6, 2008.

(51) Int. Cl.
*G06F 3/048* (2006.01)
*G06F 3/00* (2006.01)

(52) U.S. Cl. .......... 715/773; 715/745
(58) Field of Classification Search .......... 715/773, 715/745
See application file for complete search history.

(56) References Cited

U.S. PATENT DOCUMENTS

| | | | |
|---|---|---|---|
| 6,169,538 B1 * | 1/2001 | Nowlan et al. | 345/168 |
| 7,263,663 B2 * | 8/2007 | Ballard et al. | 715/762 |
| 7,366,990 B2 * | 4/2008 | Pitroda | 715/745 |
| 7,752,569 B2 * | 7/2010 | Schultz et al. | 715/773 |
| 7,885,985 B2 * | 2/2011 | Roden | 707/804 |
| 8,232,973 B2 * | 7/2012 | Kocienda et al. | 345/173 |
| 2004/0104896 A1 * | 6/2004 | Suraqui | 345/168 |
| 2004/0119751 A1 * | 6/2004 | Yoshimi et al. | 345/773 |
| 2005/0257155 A1 * | 11/2005 | Cohen et al. | 715/745 |
| 2007/0040813 A1 * | 2/2007 | Kushler et al. | 345/173 |
| 2007/0146160 A1 * | 6/2007 | Takeshita | 340/825.72 |
| 2009/0135147 A1 * | 5/2009 | Hsu et al. | 345/173 |
| 2009/0182552 A1 * | 7/2009 | Fyke et al. | 704/9 |
| 2011/0061017 A1 * | 3/2011 | Ullrich et al. | 715/780 |

* cited by examiner

*Primary Examiner* — David Phantana Angkool
(74) *Attorney, Agent, or Firm* — James A. Italia; Italia IP

(57) ABSTRACT

A method of presenting keys of a touchscreen device, to facilitate correct actuation. Following depression of a key, the device determines likelihood of selection of a subsequent key. Keys determined to be more likely to be subsequently selected are visually enhanced. Enhancement may be by presenting the keys as relatively large relative to keys not so determined, by adjusting coloring, and introducing dynamic effects, among others. Also, keys surrounding keys determined to be likely to be subsequently selected may be visually enhanced. Visually enhanced surrounding keys may have enhanced brightness relative to keys not surrounding keys so determined. Keys may be further categorized in an intermediate category as being of equal likelihood rather than of relatively great or relatively unlikely subsequent selection. Visual presentation may intuitively reflect the three categories.

10 Claims, 4 Drawing Sheets

VIRTUAL KEYBOARD WITH VISUALLY ENHANCED KEYS

CROSS-REFERENCE TO RELATED APPLICATION

This application claims the benefit of the filing date under 35 USC 119(e) of the filing date of U.S. Provisional Application Ser. No. 61/111,891, filed Nov. 6, 2008, the contents of which are incorporated herein by reference.

FIELD OF THE INVENTION

The present invention relates to devices having touch screens and which are operated by actuating virtual keys displayed on the screen.

BACKGROUND OF THE INVENTION

Electronic communications and data processing devices such as the iPhone (RTM) or HTC Diamond (RTM) and the like enjoy the benefits of miniaturization. The ability to reproduce images and to receive and transmit data forming images and messages is facilitated by miniaturized electronics. However, these devices also suffer from the drawback that miniaturization makes a keypad or touch screen which is necessary to control the device difficult to use. In particular, touch screens suffer from proximity of one switching area to an adjacent switching area and all but undefined borders separating adjacent switching areas. It is easy in a miniaturized touch screen for a person's fingers to intrude onto an adjacent switching area and inadvertently enter an unintended command.

There exists a need for a way of overcoming the problem of miniaturized switching areas in an electronic device of minimal and limited dimensions.

SUMMARY OF THE INVENTION

The present invention addresses the above articulated problem by enhancing the visual aspects of individual switches which appear on a touch screen. The device uses data processing apparatus and programming to predict selections which are subsequent to a first switching area selection, or alternatively, to offer a choice of switching areas which are rendered in more visually conspicuous fashion to the user to facilitate selection of the actual desired switching function.

The present invention firstly improves the ability to strike virtual keys with their fingers, which may by contrast be awkwardly large. The invention also highlights certain keys to assist in identifying and locating desired keys.

Illustratively, responsive to a switch command which designates a particular alphanumeric or other symbol, the device uses a logical choice or past experience to suggest subsequent symbols. The suggested symbols are rendered in a visually conspicuous manner, such as greater in size than unsuggested symbols. The more conspicuous suggested symbol is more readily recognized and actuated by the user.

It is therefore an object of the invention to address the problem of poorly discerned switching areas of touch screens of miniaturized electronic devices.

It is another object of the invention to make switching areas larger, even if only temporarily, to facilitate location and striking of desired switching areas.

It is another object to temporarily render individual switching areas more conspicuous to the user.

It is a further object of the invention to use prediction to limit the choices of switching areas to the user.

It is an object of the invention to provide improved elements and arrangements thereof by apparatus for the purposes described which is inexpensive, dependable, and fully effective in accomplishing its intended purposes.

These and other objects of the present invention will become readily apparent upon further review of the following specification and drawings.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION

Figure 1:
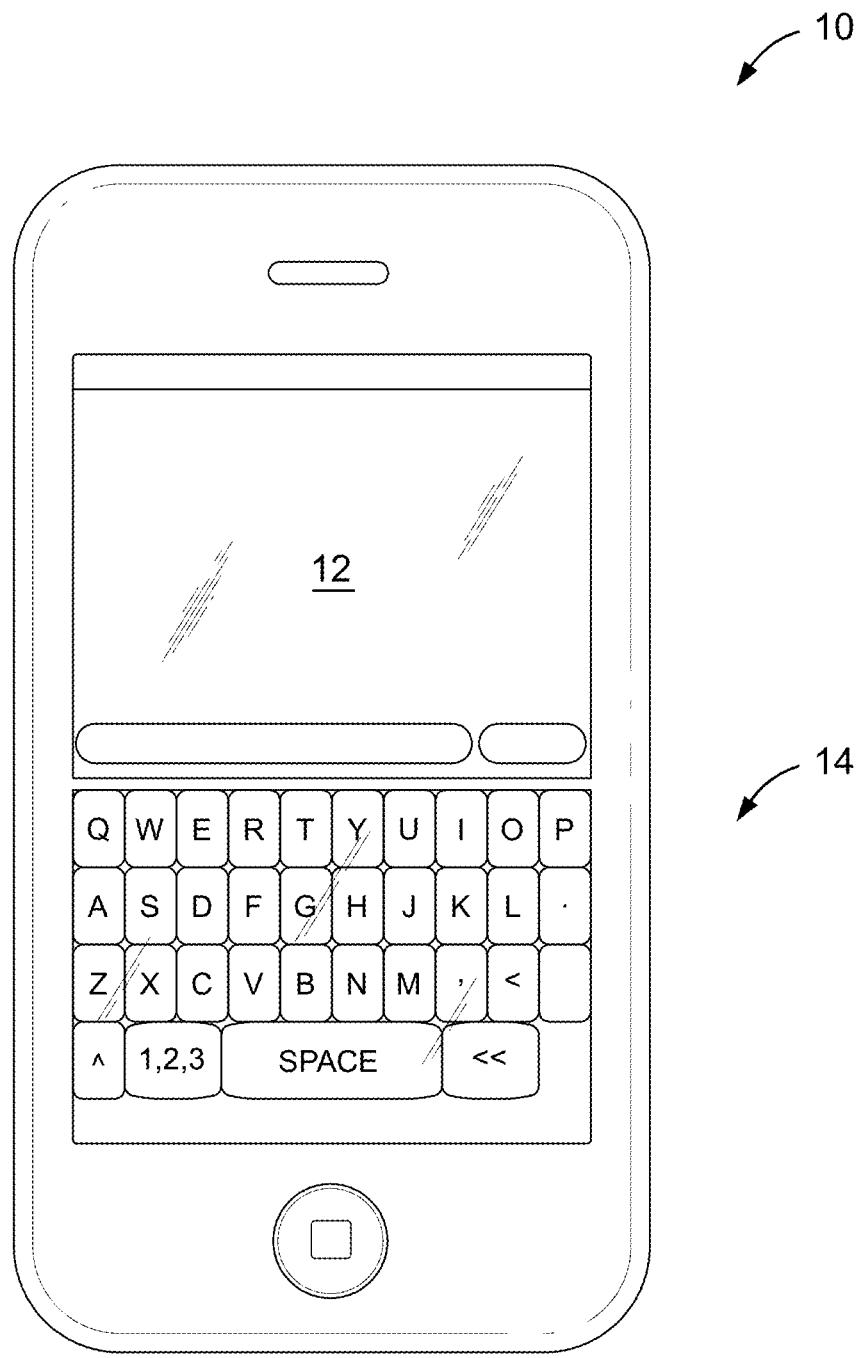
FIG. 1 is a plan view of an electronic device having a touch screen, showing an initial condition of the screen.

FIG. 1 of the drawings shows an electronic device 10 having a touch screen 12 on which are displayed keys 14. Keys 14 are the graphically represented identity of switching areas (not separately shown) of a touch screen, which operate in conventional fashion and need not be set forth in greater detail herein. Keys 14 may correspond for example to letters of the Roman alphabet, punctuation symbols, numerals, and other symbols which are typically used in textual communications. These letters, numerals, and symbols, which are well known and need not be set forth with every individual example being explicitly portrayed, may be arrayed according to a typical or standard "QWERTY" arrangement for example.

FIG. 1 depicts the initial condition of the array of keys 14, which is the array as it would appear prior to depressing any key 14. In the initial condition, all keys 14 may have a generally similar visual appearance as that refers to size, footprint, or dimensions of each key 14, font of the legend of the particular alphabetical, numeric, or symbolic character represented on each key 14, and color attributes of the background portion of each key 14.

The invention comes into play when any one key 14 is depressed. In response to depressing a key 14, the electronic device 10 introduces changes to the display of keys 14 in the following way. The electronic device 10 has circuitry, memory, and data processing capability (not shown per se) which responds to depressing of any one key 14 such that a suggestive response is triggered. The suggestive response suggests a selection of keys which would logically follow the initially depressed key. This may be accomplished in either of two principal separate ways, or by a combination of both. The first way is to establish, based on the first depressed key 14, a selection of probable words or other character strings which would logically be possible starting from the character of the first depressed key 14.

Using the example of words of the English language, it will be apparent that depressing any one key 14 causes a group of words which start with the letter of the depressed key 14 to become possible candidates of being generated as text, to the exclusion of all words which start with other letters. The data processing system of the electronic device 10 may incorporate in digital form a look-up table, or electronic "dictionary" containing a database of words of the English language. Not only will the list of possible candidate words be limited to words starting with the letter of the key 14 that was depressed, the list of possible candidates may be further limited by known letter combinations. That is, for any one initial letter, only certain letters can follow when spelling out words in the English language. Therefore, the system can then predict the next letter which may be selected to generate text.

It has been stated that there are two principal ways of suggesting subsequent character candidates, the "dictionary" approach being one. The other principal way is based on history of usage of the electronic device 10. The data processing system may enter usage into memory and identify those words or other character strings which have most often been entered into the electronic device 10. The list of possible candidates may then reflect those words or other character strings which have historically most often been entered.

One of these two ways or the other one of the two ways may be used as the principal criterion, with the other way being invoked secondarily. This approach can be used to establish an order or hierarchy of candidates for suggestion.

Returning to explanation of the suggestive process, typically, in practice, several letters, rather than just one letter, are logical candidates to follow the first letter. The system suggests all possible logical candidates by making their corresponding keys 14 more visually conspicuous to the user of the electronic device 10.

This may be done by visually increasing the size of the key 14 for each possible logical candidate letter or character. The data processing system may correspondingly reduce size of the key 14 for non-candidate letters or characters.

Figure 2:
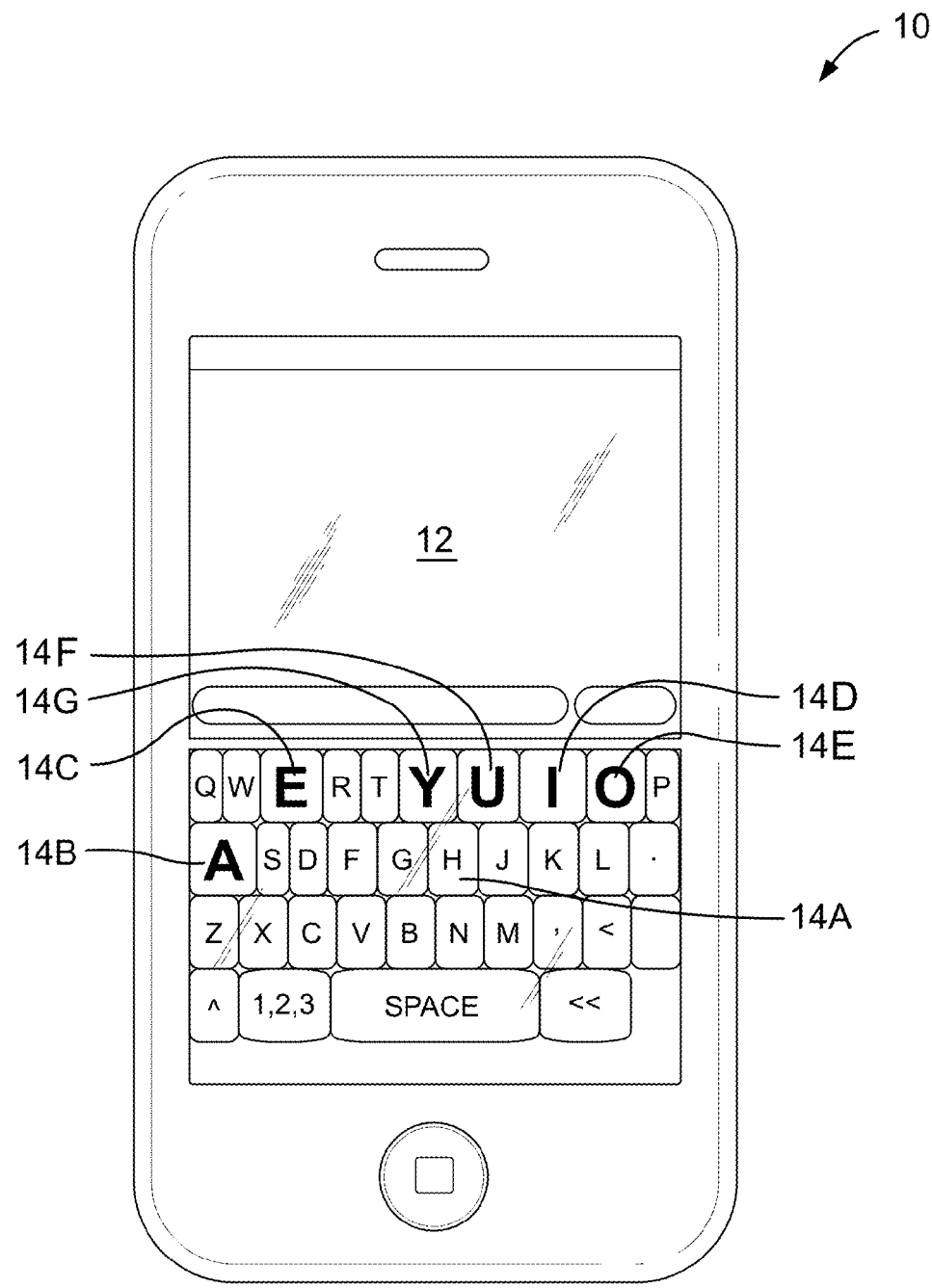
FIG. 2 is a plan view of the screen of FIG. 1, wherein certain keys have become exaggerated in width.

FIG. 2 shows an exemplary response to the key 14A of the letter "H" being depressed. The system responds by visually enhancing the keys 14B, 14C, 14D, 14E, 14F, and 14G, which respectively correspond to the letters A, E, I, O, U, and Y. In the example of FIG. 2, the size of the displayed keys 14B . . . 14F has been increased by increasing the width but not the height. This procedure may be followed where for example it is desired to avoid intruding upon touch screen space which is devoted to other purposes, such as displaying entered text as that text is generated. It would be possible if desired to increase height also, or height rather than width if desired.

This procedure may also be employed to differentiate between unequal candidates. In the above example, if one letter is determined by the system to have more possibilities that it will succeed the "H" compared to the number of possibilities of another letter, then the switching area 14 of the letter having the greater number of possibilities may be visually enhanced to a degree greater than that of the letter with relatively fewer possibilities.

It will also be seen that the legends identifying the particular character corresponding to each one of the keys 14B . . . 14F has been rendered in bold font, relative to the other characters.

Figure 3:
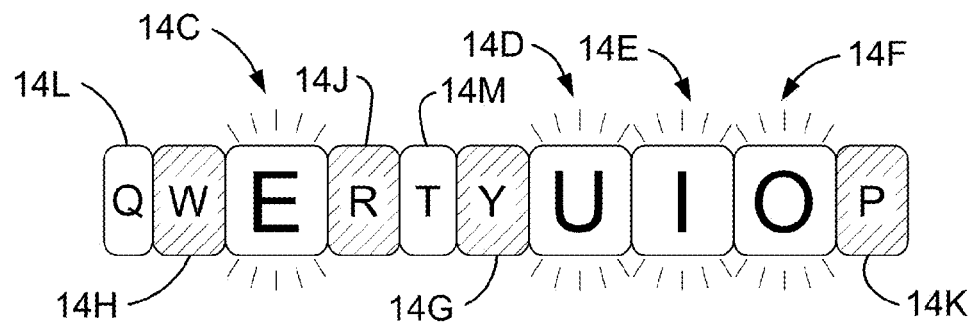
FIG. 3 is a plan detail view showing only the top row of letters of FIG. 1, with certain keys shown both exaggerated in width and also having colored backgrounds.

It would be possible to use other graphic treatments to achieve visual enhancing the keys 14. As seen in FIG. 3, the color or other characteristic or characteristics of the background of keys 14 may be changed. In the example of FIG. 3, the background of the keys 14G, 14H, 14J, and 14K (corresponding respectively to the letters Y, W, R, and P) has been modified. This modification may comprise rendering the hue of each one of the keys 14G, 14H, 14J and 14K darker, by introducing hatching (as actually depicted), by introducing cross hatching, by introducing stippling, or by otherwise changing the appearance of the background so that by contrast, the background of the suggested keys 14C, 14D, 14E, and 14F is more conspicuous to the eye. The suggested keys 14C, 14D, 14E, and 14F may receive graphical treatment to make them more conspicuous, such as by causing their backgrounds to flash or pulse (this is represented as short lines radiating from the respective keys 14C . . . 14F), brighten, or otherwise become more conspicuous.

FIG. 3 illustrates another graphical treatment of keys beyond mere suggestion of appropriate or likely selections. That is, keys neighboring the suggested keys are highlighted or emphasized in some way as an aid in selecting suggested keys, but in a subordinated way that visually distinguishes neighboring keys from the suggested keys. This helps the user to depress the actual desired keys, while making those keys and the surrounding area more conspicuous and more easily manipulated.

Figure 4:
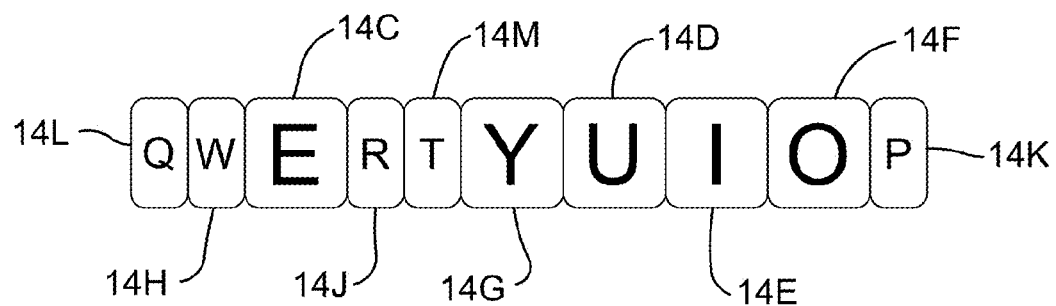
FIG. 4 is a plan detail view similar to FIG. 3, but showing three different widths of keys.

FIG. 4 shows a further aspect of the invention illustrating another way of establishing three statuses of keys rather than two statuses. In FIG. 2, there are precisely two groups of keys 14. One group comprises those keys 14 which are being suggested, and all of the suggested keys are given equal visual treatment within this first group. The second group comprises the non-suggested keys 14, all of which are once again given equal visual treatment within the second group.

In FIG. 3, there are three levels of visual treatment or statuses. That is, the suggested keys 14C, 14D, 14E, 14F are enlarged and brightened; the adjacent non-suggested keys 14G, 14H, 14J, and 14K are enlarged and darkened; and the remaining keys 14L and 14M (which correspond to the letters Q and T) are neither enlarged nor brightened or darkened.

FIG. 4 shows another scheme of three levels of visual treatment or statuses. The keys 14C, 14D, 14E, 14F (corresponding to the letters E, U, I, and O) are enlarged; the keys 14H, 14J, 14K, 14L, 14M (corresponding to the letters W, R, P, Q, T) are small in dimensions or footprint; and the key 14G (corresponding to the letter Y) is of an intermediate size.

One possible usage for visually enhancing and especially for enlarging keys 14 which are adjacent to those keys 14 which are to be selected to form text is to facilitate transition of finger position from one selected key 14 to another selected key 14. Again, invoking size adjustment enables a user to slide his or her finger to an adjacent switching area without releasing the screen, especially where the latter function is automatically invoked by the device 10.

Figure 5:
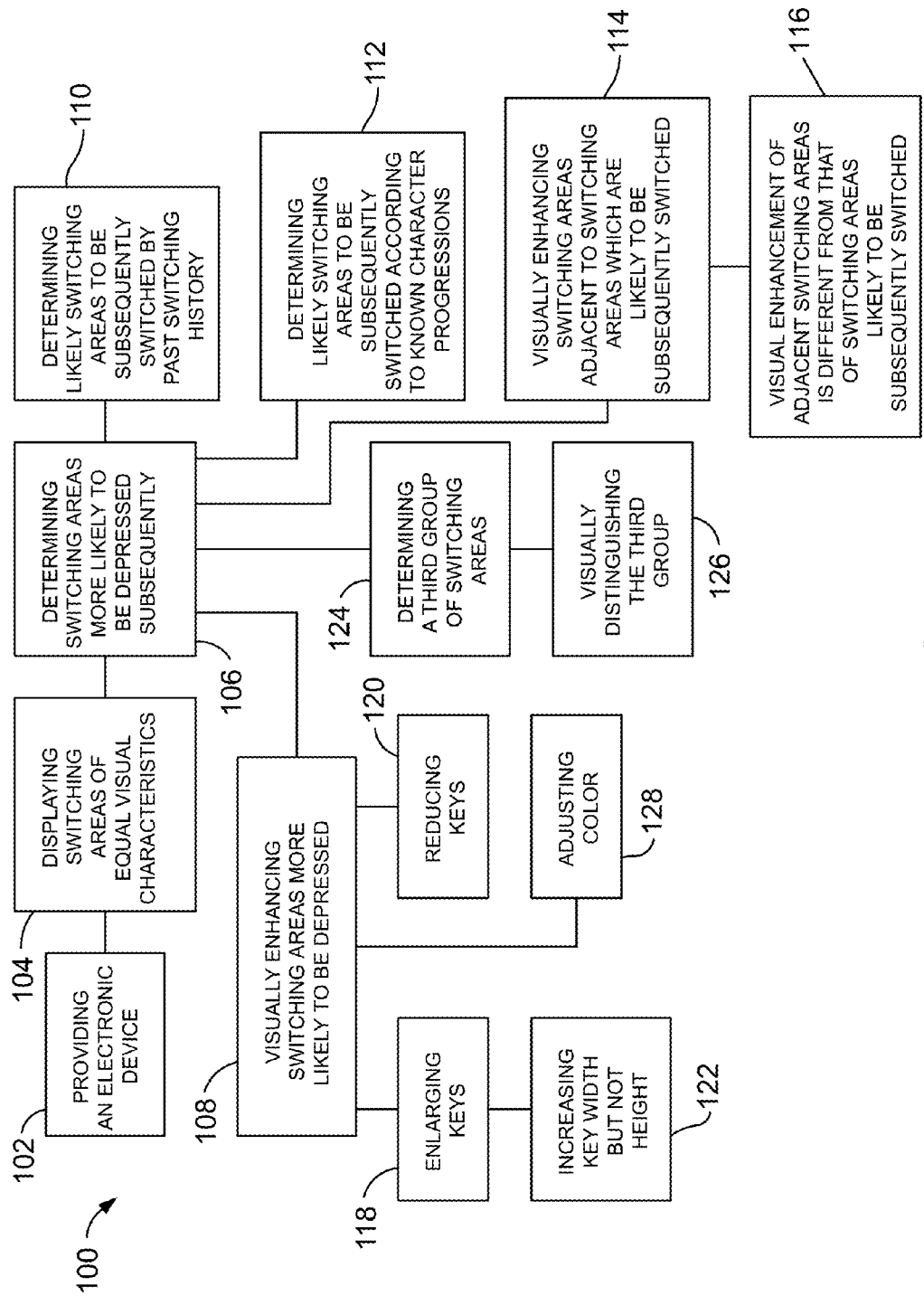
FIG. 5 is a block diagram of steps of a method of practicing the invention, and is read starting at the upper left.

Using the above system and procedures, the invention may be regarded as a method 100 of presenting switching areas, such as those corresponding to the keys 14, of a touch screen such as the touch screen 12 to an observer. The method 100, as described in FIG. 5, may comprise a step 102 of providing an electronic device such as the electronic device 10 having a touch screen, memory, and data processing apparatus.

The method 100 may comprise a step 104 of visually displaying switching areas such as those represented by the keys 14 of the touch screen as keys which may or may not initially have substantially equal visual characteristics, apart of course from legends identifying the various keys, as shown in FIG. 1.

The method 100 may comprise a step 106 of, responsively to a first switching area being depressed, determining and identifying as a first group switching areas which are more likely to be subsequently selected for depressing after the first switching area has been depressed, and determining and identifying as a second group switching areas which are less likely to be subsequently selected for depressing after the first switching area has been depressed.

The method 100 comprises a step 108 of visually enhancing display of the member switching areas of the first group relative to display of the member switching areas of the second group.

The step 106 may comprise a further step 110 of determining members of the first group by considering past switching history.

The step 106 may comprise a further step 112 of determining members of the first group by considering likelihood of each potentially selected character and associated switching area contributing to a known linguistic character progression. Known words of various languages are examples of known linguistic character progressions. Examples of known character progressions which are not words include well known acronyms and for example, the progression QWERTY, which is used representatively for designating the widely adopted array of letters for keyboards.

The method 100 may comprise a step 114 of visually enhancing switching areas which are immediately adjacent to a switching area which has been determined as more likely to be subsequently selected.

The method 100 may comprise a step 116, wherein the method of visually enhancing immediately adjacent switching areas is different from that of visually enhancing switching areas which have been determined to be members of the first group.

The step 108 may comprise a further step 118 of causing each visually enhanced switching area to be presented as an enlarged key relative to visual presentation of the keys of the second group.

The method 100 may comprise a step 120 wherein selecting of a switching area causes members of the second group to be displayed in a size less than the size of their original depiction.

The step 118 may comprise a further step 122 of increasing width of the image of an enlarged key but not increasing height of the image of an enlarged key.

The method 100 may comprise a further step 124 of determining and identifying as a third group switching areas which are equally likely to be subsequently selected for depressing after the first switching area has been depressed, and a still further step 126 of visually distinguishing the third group from the first group and the second group.

The step 108 may comprise a further step 128 of causing each visually enhanced switching area to be presented as of color different from that used for visual presentation of the keys of the second group.

The various steps of the method 100 may be practiced out of the order described herein. Also, steps may be selectively adopted and deleted where feasible.

The step 104 may be modified such that initial display of letters or other characters visually enhances those letters which are most often used prior to any selection being made.

The invention should not be construed as being limited to the precise procedures and characteristics described prior, as other characteristics are contemplated.

Other visual enhancements may encompass pulsing, flashing and other dynamic effects which change appearance over time. Changes over time may occur once, constantly, or intermittently. Legends may be made to appear to pulse, flash, vibrate, otherwise move, enlarge, or otherwise to change visual appearance to become more conspicuous.

Treatments of background of keys may also be applied to legends of keys. As employed herein, color will be understood to signify hue, brightness, or both hue and brightness.

Circuitry will be understood to comprise the number of conductors, and specific connection schemes necessary to carry out the described functions, as well as supporting apparatus. Circuitry and any of its individual components may vary in logic from that specifically described herein.

Because it is depicted in representative capacity, the data processing device 10 will be understood to include components such as central processor, memory devices, power supply and others even though these components may not be explicitly shown. Peripheral data handling devices encompass functions which support, expand, increase, enhance, and otherwise improve on the original capabilities of the data handling device, and may include items such as PCMCIA cards, ExpressCards (RTM), and the like. The data handling port may receive signals, transmit signals, or both.

While the present invention has been described in connection with what is considered the most practical and preferred embodiment, it is to be understood that the present invention is not to be limited to the disclosed arrangements, but is intended to cover various arrangements which are included within the spirit and scope of the broadest possible interpretation of the appended claims so as to encompass all modifications and equivalent arrangements which are possible.

We claim:

1. A method of presenting switching areas of a touchscreen to an observer, comprising the steps of:
   providing an electronic device having a touchscreen, memory, and data processing apparatus;
   visually displaying switching areas of the touchscreen as keys initially having visual characteristics;
   responsively to a first switching area being depressed such that an input is received and accepted by the device, determining and identifying a potential subsequent input to be received and accepted, by the electronic device and without user specification of any changes, as a first group switching areas which are more likely to be subsequently selected for depressing after the first switching area has been depressed such that an input has been received and accepted by the device, and determining and identifying as a second group switching areas, the second group switching areas being less than all switching areas, excluding the first group switching areas, on display, which are less likely to be subsequently selected for depressing after the first switching area has been depressed such that an input has been received and accepted by the device; and
   visually enhancing display of the member switching areas of the first group relative to display of the member switching areas of the second group.

2. The method of claim 1, wherein the step of determining and identifying as a first group switching areas which are more likely to be subsequently selected for depressing comprises the further step of determining members of the first group by considering past switching history.

3. The method of claim 1, wherein the step of determining and identifying as a first group switching areas which are more likely to be subsequently selected for depressing comprises the further step of determining members of the first group by considering likelihood of each potentially selected character and associated switching area contributing to a known linguistic character progression.

4. The method of claim 1, comprising the further step of visually enhancing switching areas which are immediately adjacent to a switching area which has been determined as more likely to be subsequently selected.

5. The method of claim 4, wherein the method of visually enhancing immediately adjacent switching areas is different from that of visually enhancing switching areas which have been determined to be members of the first group.

6. The method of claim 1, wherein the step of visually enhancing display of the members of the switching areas of the first group comprises the further step of causing each visually enhanced switching area to be presented as an enlarged key relative to visual presentation of the keys of the second group.

7. The method of claim 6, wherein selecting of a switching area causes members of the second group to be displayed in a size less than the size of their original depiction.

8. The method of claim 6, wherein the step of causing each visually enhanced switching area to be presented as an enlarged key comprises a further step of increasing width of the image of an enlarged key but not increasing height of the image of an enlarged key.

9. The method of claim 6, comprising the further steps of determining and identifying as a third group switching areas which are equally likely to be subsequently selected for depressing after the first switching area has been depressed; and visually distinguishing the third group from the first group and the second group.

10. The method of claim 1, wherein the step of visually enhancing display of the members of the switching areas of the first group comprises the further step of causing each visually enhanced switching area to be presented as of color different from that used for visual presentation of the keys of the second group.

\* \* \* \* \*